United States Patent [19]

Conner et al.

[11] Patent Number: 5,175,672
[45] Date of Patent: Dec. 29, 1992

[54] HOUSING APPARATUS FOR PORTABLE COMPUTER SYSTEMS

[75] Inventors: Warren J. Conner; Douglas G. Swartz, both of Boulder, Colo.; James R. Yurchenco, Palo Alto, Calif.

[73] Assignee: Outbound Systems, Inc., Boulder, Colo.

[21] Appl. No.: 565,645

[22] Filed: Aug. 9, 1990

[51] Int. Cl.$^5$ .............................................. H05K 7/00
[52] U.S. Cl. ................................... 361/393; 361/392; 361/399; 361/415; 361/429; 364/708; 340/700; 235/145 R; 248/923
[58] Field of Search ............... 361/392, 393, 394, 399, 361/415, 380, 429; 340/700, 711; 364/708; 235/145; 248/117, 923

[56] References Cited

U.S. PATENT DOCUMENTS 4,742,478 5/1988 Nigro, Jr. et al. .................. 364/708

FOREIGN PATENT DOCUMENTS 0160418 8/1985 Japan .................................. 364/708
0189523 9/1985 Japan .................................. 364/708
0189525 9/1985 Japan .................................. 364/708

Primary Examiner—Leo P. Picard
Assistant Examiner—Young S. Whang
Attorney, Agent, or Firm—Timothy J. Martin; Dana S. Rewoldt

[57] ABSTRACT

A case for electronic components of a computer has a base section and a central section hinged together along a pivot axis. The base section provides a base compartment for first electronic components and may rest on a support surface. The central section provides a central compartment for second electronic components and has a front face with a display panel. The hinge structure is positioned so that, in a closed position, the base section is folded against the back of the central section. In an open position, the central section is elevated at an angle to the support surface with the base section extending rearwardly of the pivot axis which is located proximately to the intersection of the top and front walls of the base section. A cover may be secured to cover the display, and this cover can include a keyboard input for the computer. The keyboard/cover may also be releasably securable to the base section. The base section can include a rearwardly extending wing to prevent tipping of the unit in the open position. The central section can include a bag for nestably receiving the base section in the closed position.

32 Claims, 5 Drawing Sheets

HOUSING APPARATUS FOR PORTABLE COMPUTER SYSTEMS

FIELD OF THE INVENTION

The present invention generally relates to a housing structure for electronic equipment, but specifically relates to compact, portable housing for microprocessor computers. Of special concern, then, to the present invention, is a chaise or case for components which comprise an electronic calculating system, and this invention has particular use for portable or "lap top" computers.

BACKGROUND OF THE INVENTION

Since the earliest development of electronic equipment, manufacturers have recognized the need for sturdy housing assemblies within which to mount or store the electronic equipment or which form a case for mounting electronic circuitry and components. With the increased sophistication of equipment and the miniaturization of components, more and more electronic equipment have been constructed as portable systems which may be transported from location to location for use by the operator. Indeed, due to the reduction in power demands of these systems, many types of electronic equipment now include an internal power supply in the form of a rechargeable battery pack.

Perhaps the field where the reduction in size and weight of electronic equipment has been most dramatically felt, in recent years, has been in the computer industry. In the early days of this industry, computers were based on vacuum tube technology and had limited computing capacity even though the equipment itself occupied thousands of cubic feet of storage and had elaborate cooling systems. Present technology has allowed miniaturization of computer systems, and, by the mid 1980's, computer systems having significant processing and storage capabilities were reduced in size so as to make practical the portability of such systems. Initially, the "portable" computers were still quite bulky and cumbersome to transport and still required enough power so that they could not readily be powered by conveniently portable battery packs. Within just a few years, as of the date of this disclosure, further advancements in circuit technology has resulted in truly portable computers having significant computing capabilities and substantial memory capacity.

At the time of this disclosure, three main types of transportable computers are dominant in the industry. At one end of the spectrum are the "portable" computers which may weigh on the order of six to eight kilograms and have a footprint of 0.1–0.15 meter$^2$. At the other end of the spectrum are the note pad computer/calculators which weigh anywhere from several hundred grams to about one kilogram; these units can have foot prints on the order of fifty to one hundred centimeter$^2$. In between the portable computers and the note pad computer/calculators reside computer systems which may truly be deemed "lap top computers". These computers may weigh on the order of four to six kilograms and have foot prints on the order of 0.1 meter$^2$.

The present invention principally concerns the portable and lap top computers. In each of these units, the size of the housing and the associated keyboards is becoming dictated by the ergonomics of interaction with the human body as opposed to the limitations of circuitry technology. That is, the size of the keyboard is dictated by the size of the human hand and fingers in operating the keys while the display size must be large enough so that visual output is of sufficient size and content to be meaningfully seen and comprehended. It is anticipated that the size of these units will remain relatively constant so that advancements in circuit technology will result in computers of the same size having greater memory and processing capabilities.

Currently, housing constructions for both portable and lap top computers is dominated by the "clam shell" case, an example of which may be seen in U.S. Pat. No. 4,571,456 issued Feb. 18, 1986 to Paulsen et al. Here, a central unit is provided which houses both a keyboard and the processing circuitry for the computer system. A lid is hingedly secured to this central section so that the lid folds over and protects the keyboard, and this lid may be latched into the closed position. When used, the lid is unlatched and tilted at an angle with respect to the central housing. This lid carries a display panel for the computer as a visual output allowing the user to receive visual output corresponding to the processing being performed by the computer. Virtually all portable and lap top computers utilize this general clam shell construction, with different manufacturers making slight modifications for functional operation and/or aesthetic appearance.

A problem with respect to the clam shell housing construction, however, is that the central section has a fairly large footprint when placed on a desk or other support surface. Further, since the display panel and the keyboard contained within the central section are mechanically connected, the distance between the keyboard and the display may not be varied to accommodate individual user preference Further, a problem arises with many of these units in that a separate support surface is necessary for comfortable use of the computer system. That is, typically, the user must place the unit on a desk, table or other surface so that the user can sit at a chair while operating the system. This defeats the "lap top" concept wherein a user can hold the unit on his/her legs while operating the computer. There is therefor need for alternate and improved computer case construction which can help to eliminate some of these disadvantages.

SUMMARY OF THE INVENTION

It is an object of the present invention to provide a new and useful case for housing a computer system which case has a pedestal construction thereby reducing the footprint of the computer system.

It is another object of the present invention to provide a case construction for housing a computer system wherein a keyboard input is constructed as a detachable unit of the case system so as to allow a user to vary the distance between the keyboard and the display screen.

A still further object of the present invention is to provide a case for housing a computer system which comprises a central section that is pivotally attached to a base unit in a pedestal manner and which has a detachable keyboard unit which functions, when secured to the central section, as a protective cover for the display screen thereof.

Yet another object of the present invention is to provide a case construction for a computer system which includes a safety switch so that, when placed in a folded or stored state, power to the system is automatically disconnected to prevent the computer system from overheating.

A further object of the present invention is to provide an improved keyboard structure a computer system so as to reduce the profile of the keyboard while providing an ergonomically pleasing keyboard at a reduced cost.

Accordingly, the present invention provides a case operative to house electronic components for processing systems, such as computers and the like. Broadly, the invention includes a base section that encloses a base compartment and a central section that encloses a central compartment. The base section receives first electronic components, such as a battery pack and recharging circuitry, and is adapted to be supported on a support surface. Second electronic components, such as the actual processing circuitry for computer processing system, are mounted in the central compartment. The central section has a front and a back, with the front forming a face that includes a display panel portion. The base section and central sections are hingidly secured to one another so that they may pivot with respect to one another along a pivot axis. In a closed position, the base section is folded against the back of the central section while in an open position, the base section is oriented on a support surface and the central section is elevated on an angle with respect to the support surface so that the display panel is oriented for view by a user. The base section has a front wall portion that extends between the bottom and top walls so that the front wall portion intersects said top wall at an upper front portion of the base section. The pivot axis is located approximately to this intersecting portion so that the base section extends rearwardly of the pivot axis.

In the preferred embodiment of the present invention, a cover section is provided which is securable to the central section in a fastened position so that the cover section covers the display panel portion. This cover section preferably mounts additional electronic components, such as a keyboard input for the computer processing system. Where additional electronics are included within the cover section, signals produced by the third electronic components are transmitted to the processing system components, preferably by wireless electromagnetic radiation. To this end, the cover section includes a transmitter while a receiver is mounted either in the central section or in the base section. In circumstances where it is desirable to physically secure the cover section, containing a keyboard, to the joined unit comprising the base section and the central section, a latching structure is provided to lock the cover section to the base sections so that the cover section extends forwardly thereof. This latching structure may be a male and female bayonet latch, and suitable alignment slots and mounting tabs may be provided to help effect the locking of the cover section to the base section.

Further, it is preferred that the display panel be inset a small distance with respect to the front surface of the central section so that a recess is formed in the face of the central section. Where the cover section provides a keyboard for the computer processing system, this recess is dimensioned to receive the keys of the keyboard which project upwardly through an upper opening in the upper wall of the keyboard section when the cover is in the fastened position. Again, to facilitate fastening of the cover section to the central section, additional mounting slots are provided which receive the mounting tabs on the cover section and suitable fasteners are provided to hold the cover section onto the central section. A plurality of positioning posts may also be provided on the cover section, extending upwardly from the upper wall thereof, with the positioning posts sized and oriented to extend into the recess whereby the cover section engages the central section by means of the positioning posts and the mounting tabs.

The back of the central section is preferably formed with a stairstep construction so that it has a lower portion and an enlarged upper portion thereby defining a bay. When the base section is moved into the closed position, it is nestably received within this bay. The bay section may also include a support wing which extends rearwardly thereof so that a recess is formed on the back of the central section, with this rear recess being dimensioned to nestably receive the support wing. The electronic components in the bay section and the central section are respectively organized within their respective compartments so that the resulting center of gravity allows the central compartment to be held at a minimum acute angle of 45° or less with respect to a horizontal surface when the base section is supported thereon and when the cover section/keyboard is detached from the base section. Preferably, the display panel may be oriented in at angle with respect to the support surface of up to at least 85°. Thus, the central section is adjustably pivotal along the orientation angle and a counter balancing structure in the form of bias springs and a clamp brake is provided so as to hold the central section in the selected orientation angle with respect to the support surface.

In order that the processing system be disabled when in the closed position, a reed switch is provided in the base section and a magnet is provided in the central section so that, when the base section and central section are placed in a closed position, the magnet interacts with the reed switch to deactivate the processing system. De-activation prevents the processing system from overheating when in the closed position. The magnet and reed switch locations, of course, can be interchanqed. Further, it is preferred that the magnet be a magnet associated with an audible output speaker for the processing system.

Also according to the preferred embodiment of the present invention, the keyboard unit which functions as the cover section has a novel key cap arrangement that is ergonomically suited to a human user while at the same time providing an extremely low profile. To this end, the keyboard unit is defined by a housing enclosing a keyboard interior and including a lower wall and an upper wall with the upper wall having an opening formed therein. A plurality of switch elements are disposed within the interior of the keyboard housing with each switch element having an actuator which may be operated to signal the processing circuitry. The switch elements are organized as a switch array having a plurality of rows, there being a front row, a back row and at least one intermediate row of the switch elements. Cap elements are provided for the switch elements so that the cap element activates the actuator to energize the switch thereby signaling the computer processor. Each cap element extends upwardly from the switch array to project outwardly of the keyboard housing through the opening. The cap elements are arranged generally in a common plane with each other, and each cap element has a front portion having a common height. The rear portions of the cap elements in the front and intermediate rows have a lesser height than the height of the front portions of the adjacent cap element in an adjacent row. The rear portion of each of the cap elements in the back row preferably has a height substantially the same as the height of the front portion thereof, and the front portions of all of the key elements have sloping faces that extend upwardly from the upper wall of the keyboard unit. Further, it is desired that the front row of the switch elements include a space-bar key, which may be centrally located within the front row, and a cursor moving device is mounted in the keyboard housing immediately forwardly of the space-bar key.

These and other objects of the present invention will become more readily appreciated and understood from a consideration of the following detailed description of the preferred embodiment when taken together with the accompanying drawings, in which:

DETAILED DESCRIPTION OF THE PREFERRED EMBODIMENT

The present invention is directed to new and useful case constructions for processing equipment, such as computer processing systems, and the disclosure of this invention includes an improved keyboard construction for use with such processing equipment. In its broad form, the present invention includes three principal parts: a base section, a central section and a keyboard section which provides a cover for a visual display associated with the processing system. The base section and central section house the processing circuitry and power supply (including a battery) for the system and are pivotally attached to one another so as to be movable from an open position to a folded or closed position. The keyboard/cover section is releasably mountable to the central section so that, when the case is folded together and the keyboard cover attached, a compact carrying case is formed for the processing equipment. Further, the system has a relatively small footprint. These features will become more fully understood and the advantages of this system appreciated with reference to the following description of an exemplary embodiment of this case construction. However, it should be understood that the embodiment described below is for purposes of example and as an explanation of the features of the present invention without unduly limiting the scope of this patent as defined by the appended claims.

Figure 1:
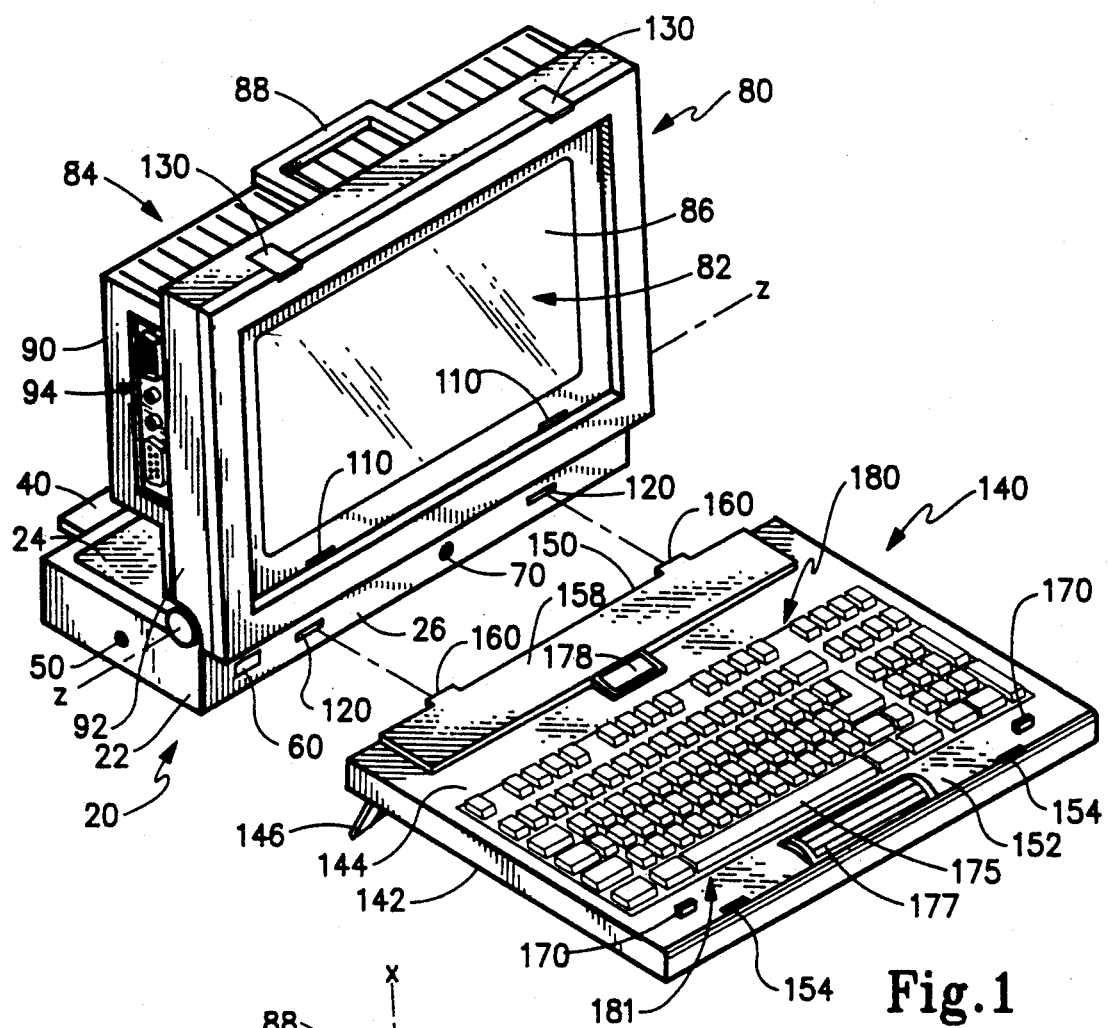
FIG. 1 is a perspective view of a computer processing system housed in the improved case according to the preferred embodiment of the present invention.
Figure 2:
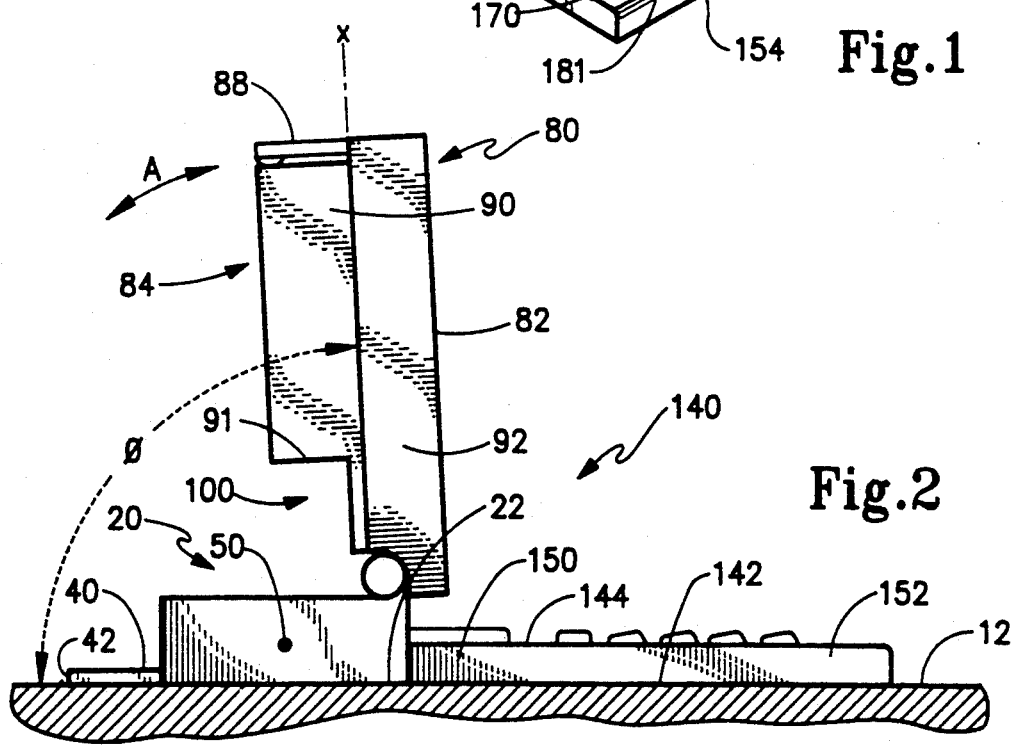
FIG. 2 is an end view in elevation of the computer processing system and case construction of FIG. 1 shown with the keyboard unit in an open, attached orientation.
Figure 3:
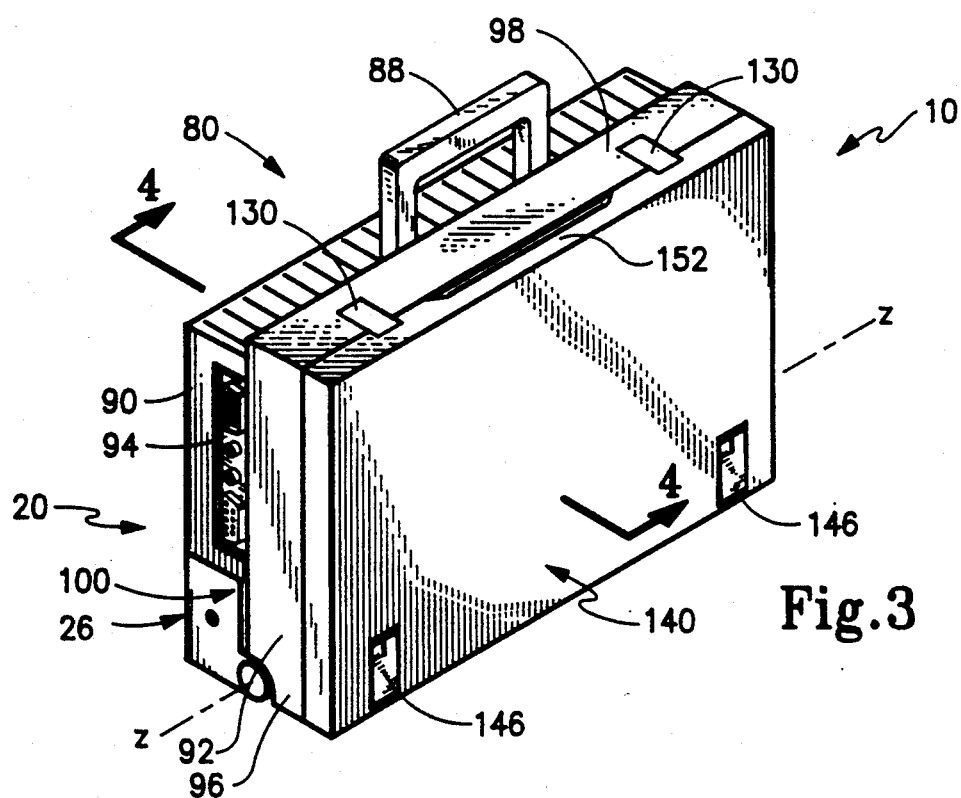
FIG. 3 is a perspective view of the case for the computer processing system of FIGS. 1 and 2, shown in a folded or stored state.

With reference to FIGS. 1-3, it may be seen that a case 10 is provided for a computer processing system, and case 10 includes a base section 20, a central section 80 and a keyboard section 140. Central section 80 and base section 20 are secured to one another for pivotal movement about a pivot axis Z and are shown in FIG. 1 in an open position. In this position also, keyboard section 140 is detached from central section 80. Central section 80 includes a front 82 and a back 84 with front 82 having a face formed by a visual display panel 86 that is recessed a small distance into central section 80. A handle 88 is pivotally mounted on an enlarged upper portion 90 of central section 80; handle 88 is positioned so as to be contained within that vertical plane which also contains the center of gravity of case 10. Lower portion 92 of central section 80 is then connected to base section 20. Suitable peripheral ports 94 are provided for connecting to external input/output devices.

Base section 20 extends rearwardly of pivot axis Z and includes a rearwardly extending support wing 40 to help support central section 80 in the open position, as described more thoroughly below. Base section 20 has a front wall 26 which has a female latch structure 70 and an infrared receiver 60 as described more thoroughly below. Base section 20 has a bottom wall 22 which may rest on a suitable support surface and has a top wall 24 in spaced, parallel relation to bottom wall 22. An electrical connector 30 is provided for attachment of an external power supply for a computer processing system housed in case 10, both to operate the processing system and to recharge a battery pack which may be contained in base section 20.

Keyboard section 140 has a lower wall 142 and an upper wall 144 through which projects a plurality of keyboard keys defining an array 180. A cursor locator device 182 may also be included in keyboard section 140. A pair of legs, such as support leg 146 may be positioned to extend downwardly from lower wall 142 so as to elevate a rear portion 150 of keyboard section 140. Rear portion 150 of keyboard section 140 includes a pair of rearwardly projecting mounting tabs 160 which are adapted to be received in a corresponding pair of mounting slots 110 formed in central section 80 or a pair of alignment slots 120 formed in front wall 26 of base section 20, again as more thoroughly described below. Locator or mounting posts 170 extend upwardly from upper wall 144 again to assist in positioning keyboard section 140 when used as a cover for the front 82 of central section 80. A lever 178 is mounted in upper wall 144 of keyboard section 140 and may be operated to rotate and release a male latching structure provided to engage female latching structure 70, as explained below.

As noted above, case 10 is operative to be positioned on a support surface, such as horizontal support surface 12 shown in FIG. 2. In this figure, it may be seen that keyboard section 140 may be releasably secured to front wall 26 so that in this attached state, keyboard section 140 cooperates with base section 20 to define a relatively stiff support for central section 80 which projects upwardly and centrally of the joined sections. Central section 80 may thus be oriented along a plane X that is parallel to the front 82 of central section 80, and central section 80 may be adjustably pivoted or tilted forwardly and backwardly as shown by arrow A. Case 80 can therefore be oriented at a selected angle $\phi$ with respect to support surface 12. Back 84 of central section 80 has a stairstep configuration so that enlarged upper portion 90 forms a shoulder 91 proximate lower portion 92. A bay 100 is then created with bay 100 dimensioned to nestably receive base unit 20 in a closed position (FIG. 3). Support wing 40 terminates rearwardly in a rear edge 42 that is in a common plane with flat bottom wall 22; lower wall 142 of keyboard section 140 is also coplanar with bottom wall 22 when keyboard section 140 is locked onto base section 20. When in the open state, as shown in FIG. 2, central section 80 may be oriented at any select angle $\phi$, preferably between 0° and 85°. The internal components are organized in their respective compartments so that the center of mass of central section 80 and the size of base section 20 is engineered to allow a minimum support angle of 45° or less, even in the detached state shown in FIG. 1 as would be within the skill of an ordinary artisan in this field based on the teachings of this disclosure.

With reference to FIG. 3, it may be seen that case 10 is in the closed position with keyboard section 140 being in the fastened position covering the front of central section 80. Here, it may be seen that base section 20 is folded about pivot axis Z and is latched in this closed position within bay 100. In this position, base unit 20 is adjacent lower portion 92 of central section 80. Front wall 26 of base unit 20 is generally co-planar with lower sidewall 96 of central section 80 so as to provide a base for case 10 when in the closed position. A pair of fasteners 130 are located on an upper sidewall 98 of central section 80 opposite lower sidewall 96. Fasteners 130 attach to tongues 154 located on a front portion 152 of keyboard section 140 with tongues 154 being best shown in FIG. 1. Handle 88 is pivotally connected to central section 80 so that it may be readily grasped by the user so that case 10 may be manually carried.

Figure 4:
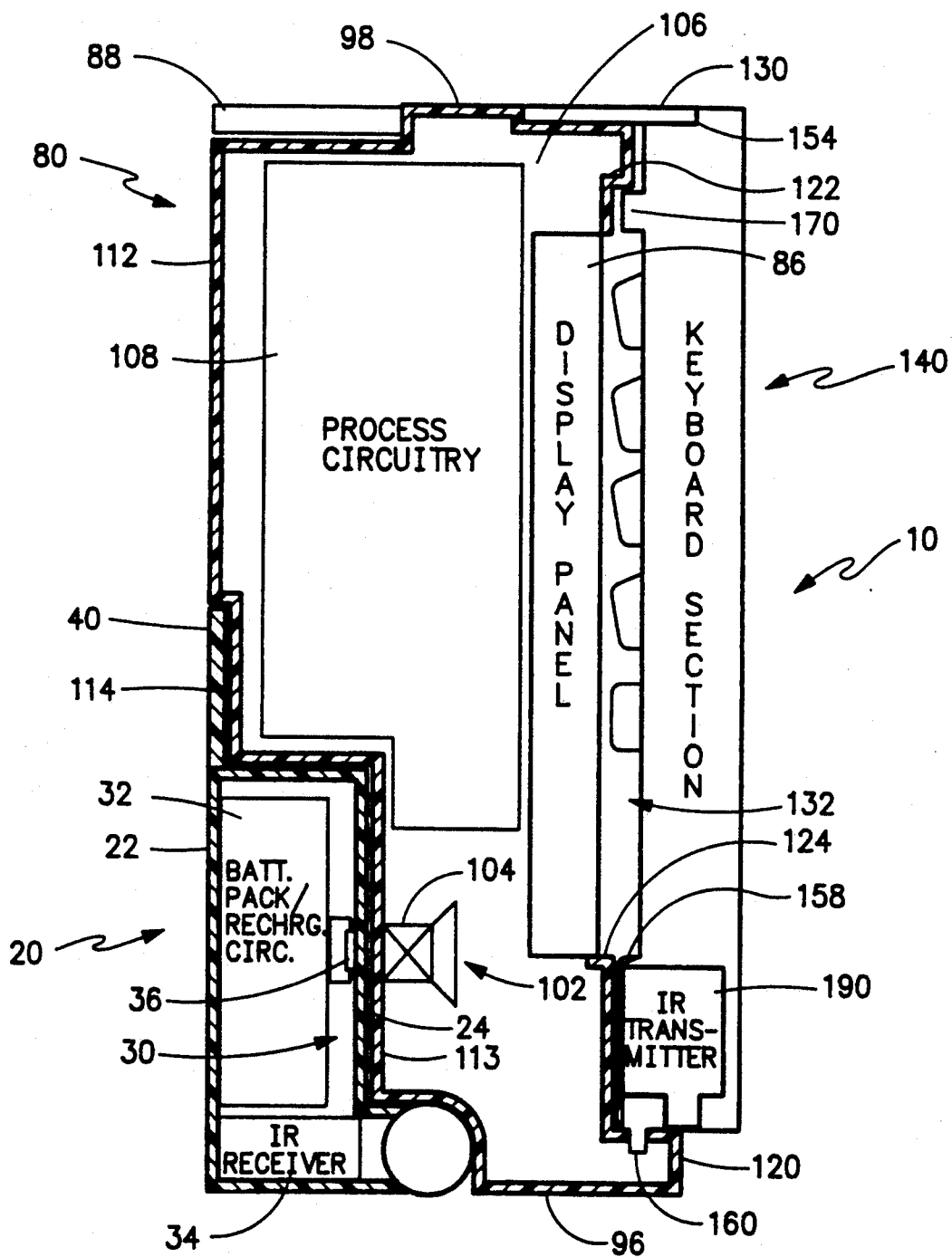
FIG. 4 is a cross-sectional view, in partial diagrammatic form, taken about lines 4—4 of FIG. 3.

The securing of case 10 in the closed position of FIG. 3 may also be more fully understood with reference to FIG. 4 which is a cross-section of case 10. In FIG. 4, it may be appreciated that case 10 is used to house a processing system, such as a lap top computer. To this end, base unit 20 defines a base compartment 30 which encloses selected electronic components, such as a battery pack and recharging circuitry 32 and an infrared receiver 34. Of interest to the scope of the present invention is the inclusion of an on/off reed switch 36 in base compartment 30 which is oriented to act in conjunction with a magnet 104 of an audio output speaker 102 contained in central section 80. Thus, it should be understood that central section 80 similarly encloses a compartment, such as compartment 106, that houses the processing circuitry for the computer system, as represented as processing circuitry 108. Central section 80 also supports display panel 86 and the processing circuitry associated therewith. Suitable connecting wires are provided for the various electronic components. When folded against central section 80, bottom wall 22 of base section 20 is generally planar to back wall 112 of enlarged upper portion 90 of central section 80 while top wall 24 of base section 20 is in closely spaced parallel relation to back wall 113 of lower portion 92. A rear recess 114 is provided in back wall 112 with recess 114 being configured to nestably receive support wing 40 in the closed state.

As may also be seen in FIG. 4, keyboard section 140 may be fastened to the front of central section 80 as a cover for display panel 86. To this end, mounting tabs 160 are inserted in a mounting slot 110 and fastener 130 is used to engage tongue 154. As may be seen in FIG. 4, display panel 86 is recessed into central section 80 so that a front recess 132 is presented to accommodate keyboard array 180. In order that keyboard section 140 be held firmly with keyboard array 180 and recess 132, positioning posts 170 are provided to abut an upper shoulder 122 while a lower rib 158 is provided on keyboard section 140 to abut surface 124 at the front of central section 80. Posts 170 acting in conjunction with mounting slots 110 and mounting tabs 160 to hold keyboard section 140 in position so that, when fasteners 130 secure keyboard section 140 onto central section 80, keyboard section 140 will not become inadvertently dislodged. Keyboard section 140 also carries electronic components, including an infrared transmitter 190. Keyboard section 140 communicates with processing circuitry 108 by means of transmitter 190 which generates electromagnetic signals received by receiver 34. Accordingly, no hard wire interconnection is necessary between keyboard section 140 and the processing circuitry, although it is certainly within the scope of this invention to employ hard wire technology. It should be appreciated, though, that other types of wireless communication would be possible, including microwave, optical or other wireless data linkage apparatus.

Figure 6:
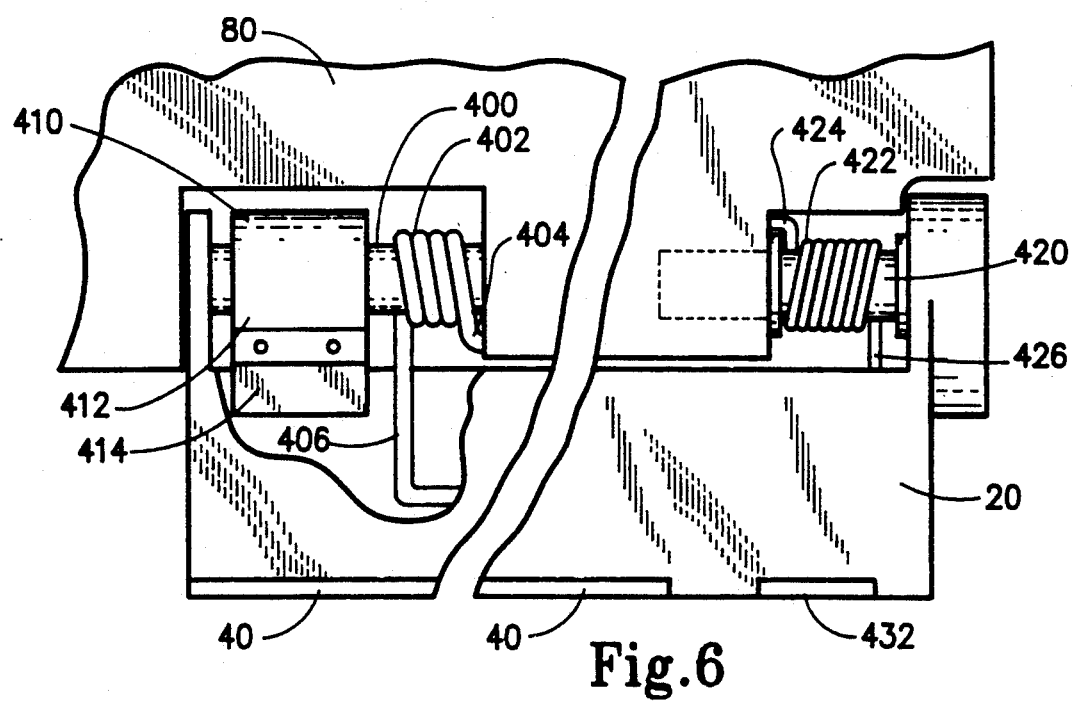
FIG. 6 is a rear view in elevation, partially broken away, showing the hinging construction between the base unit and central unit of the computer case of FIGS. 1-3.
Figure 5:
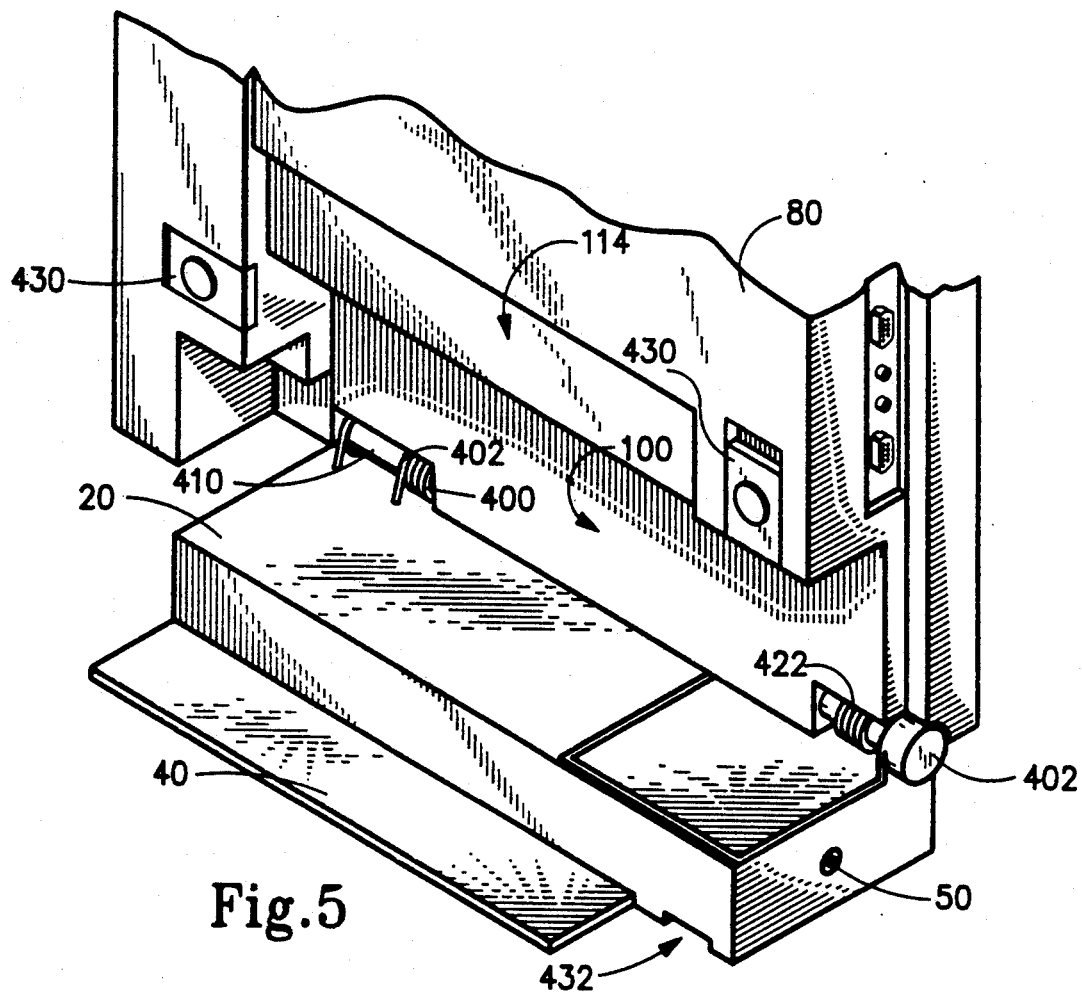
FIG. 5 is a rear perspective view of the base and central sections of the computer case shown in FIGS. 1-3, with the case being shown in an open state.

The nestability and hinging features of base section 20 and central section 80 may be further understood with references to FIGS. 5 and 6. As is shown in these figures, it may be seen that pivotal connection between base section 20 and central section 80 is accomplished by a pair of trunnions 400 and 420. A first spring 402 is wrapped around trunnion 400 and includes a first end 404 which engages central section 80 and a second end 406 which engages base section 20. Similarly, a spring 422 is provided for trunnion 420 and has a first end portion 404 that engages central section 80 and a second end portion 426 which engages base section 20. Springs 402 and 422 are provided to counterbalance the weight of central section 80 when it is positioned at an acute angle $\phi$ thereby making it easier to open and close the unit. To this end, also, a brake assembly 410 is provided at trunnion 400 with brake 410 including a first clamp section 412 and a second clamp section 414 which may be tightened onto trunnion 400 thereby providing a frictional force to resist rotation. Thus, an assembly, a mechanical balance is provided by adjusting the clamping action of brake assembly 410 in conjunction with the strength of springs 402 and 422 so that angle $\phi$ may be readily adjusted yet, when released, will hold the selected position. To retain base section 20 in a closed position, wherein support wing 40 is received in rear recess 114 and base section 20 is received in bay 100, it may be seen in FIG. 5 that a pair of slide clasps 430 are provided to engage notches, just as notch 432 on base section 20.

Figure 7A:
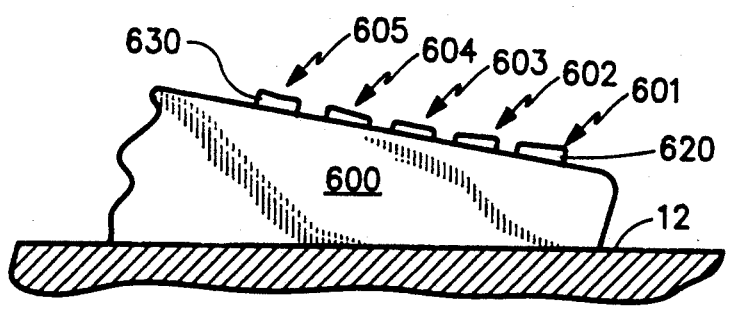
FIGS. 7(a) and 7(b) are cross-sectional views showing a prior art keyboard organizations.
Figure 7B:
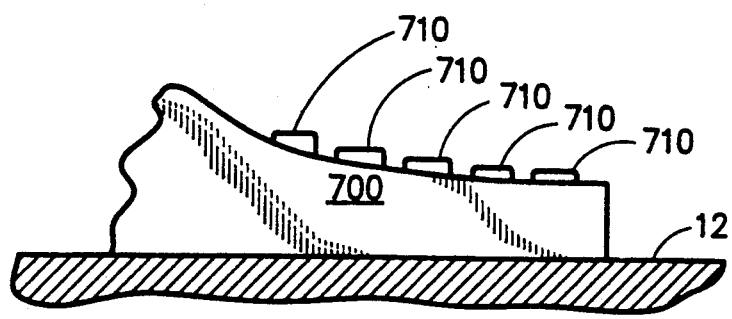

As noted above, keyboard section 140 includes general improvements to keyboard construction, which improvements have value on their own merit but also which cooperate with the construction of base section 20 and central section 80 in the present computer case 10. With references to FIGS. 7(a) and 7(b), it may be seen that the standard prior art techniques for constructing keyboard either uses a flat shaped keyboard (FIG. 7(a)) or a concave keyboard (FIG. 7(b)). In the case of a flat keyboard 60, a false sense of concavity is provided by varying the sizes of each row of keys 601-605 so that, for example, a shorter key 610 is located at center row 603 array while taller keys, such as keys 620 and 630, are located in the extreme end rows. In FIG. 7(b), keys 710 of generally the same size may be mounted in an arcuate manner on keyboard 700 to accomplish the concavity.

Figure 8:
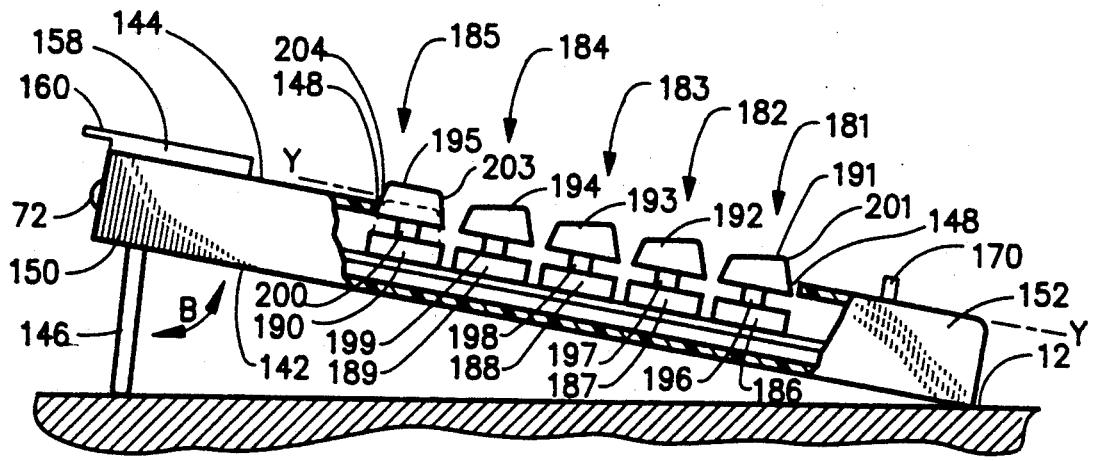
FIG. 8 is a cross-sectional view showing the improved keyboard construction according to the present invention.

It is desirable in keyboard constructions that a user be able to tactilely sense each row so that a back portion of a key is lower than the front portion of the next adjacent row. This is accomplished in the present invention with the structure shown in FIG. 8 which allows for a thinner profile for keyboard section 140. With reference to FIG. 8, it may be seen that keyboard section 140 has an array of keys 180 in the form of a plurality of rows such as a frontmost row 181, rearmost row 185 and intermediate rows 182, 183, 184. Each key has a respective switch, such as switches 186-190 which are interconnected to caps 191-195 by means of actuator elements 196-100. Keys 191-195 project upwardly through keyboard opening 148 and it may be seen that all of keys 191-195 have centers which are oriented in the plane Y with one another with plane Y being parallel to upper wall 144 of keyboard section 140. Legs 146 are mounted to the rear portion 150 of keyboard section 140 and pivot between an extended state, shown in FIG. 8, and a folded state, shown in FIG. 3, in the direction shown by arrow B.

It may be seen in FIG. 8 that each of rows 181-184 have key caps 191-194 which are identical to one another. These caps are mounted so that a front surface portion, such as portion 201 of key 191 is taller than rear portion 202 of key 191. Thus, the rear portion of each key is shorter than the front portion of the next adjacent key. This is also true with respect to rows 184 and 185 in that the front portion 203 of key 195 is equal in height to front portion 201 of key 191. However, rear portion 204 of key 195 is at the same height as front portion 203. By using this special key caps for row 185, when actuated, rear portion 204 does not drop below the level of wall 144, as is shown in phantom in FIG. 8.

An additional improvement is provided by installing a cursor mover 178 centrally of keyboard section 140 so that it may be operated to move a cursor on display panel 86 without requiring that the user move his/her fingers from the "home position". As is shown in FIG. 1, frontmost row 181 of keys includes a space bar 175 centrally located therein. Cursor mover 177 is then located immediately forwardly of space bar 175. Thus, cursor mover 177 can be operated by the user's thumbs without changing finger placement.

Figure 9:
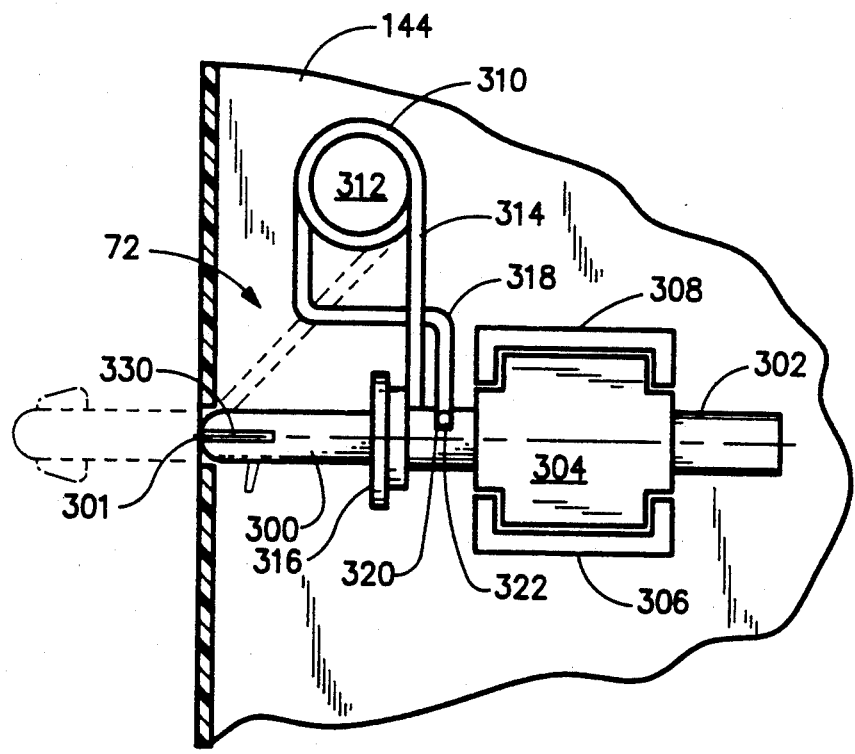
FIG. 9 is a top view, partially broken away, showing the bayonet latch for interconnecting the keyboard of FIG. 6 with the base unit of the computer case shown in FIGS. 1 and 2.

Finally, as noted above, it is sometimes desirable that keyboard section 140 be directly secured to base section 20 and this is accomplished by means of registration of mounting tabs 160 with alignment slots 120 in front wall 26 of base unit 20. When tabs 160 mate with slots 120, female latch structure 70 is aligned with male latch structure 72 shown in FIG. 8, and transmitter 190 is aligned with receiver 34. This male latch structure is depicted with greater specificity in FIG. 9 where it may be seen that female latch structure 70 is formed by a bayonet rod 300 that has a shank 302 which extends through fitting 304 which may be rotatably driven between brackets 306 by means of operation of lever 178 (FIG. 1). Thus, bayonet rod 300 may move from a retracted position shown in FIG. 9 to an extended position shown in phantom in FIG. 9. In order to forcibly drive bayonet rod 300 toward the extended position, a spring 310 is mounted on a post 312 formed on the underside of top wall 144 of keyboard section 140. Spring 310 has a first end portion 314 which bears against shoulders 316 that are rigidly secured to rod 300 so that, when released, spring 310 drives rod 300 towards the extended position, again as shown in phantom in FIG. 9. Spring 310 has a second end portion 318 which engages a notch 320 in shank 302 in the retracted position to hold bayonet rod 300 in the retracted state with spring 310 under compression. However, when fitting 304 is rotated, rod 300 turns one-quarter turn so that the distal end tang 322 of end portion 318 is disengaged from slot 320 thus allowing the spring to drive rod 300 toward the extended position. When keyboard section 140 is positioned against front wall 26 with tabs 160 engaging slots 20, movement of rod 300 toward the extended position drives nose 301 into female latch structure 70 after which fitting 304 may be rotated by means of lever 178 which causes rod 300 to turn 90°. Rod 300 is provided with radial projections 330 proximate nose 302 and projections 330 engage female latch structure 70, thus locking keyboard section 140 onto base section 20 as is best shown in FIG. 2. Conversely, rod 300 is released from female latch structure 70 by again using lever 178 to rotate fitting 304 so that projections 330 disengaged the female latch structure. The keyboard section 140 can now be detached, and rod 300 returned to the stored position by pressing nose 301 so that rod 300 advances into the interior of keyboard section 140 a distance sufficient to engage tang 322 in slot 320.

From the foregoing, it may be appreciated that case structure 10 is particularly suitable for portable or lap top computers and provides advantages not heretofore found in prior art assemblies. With reference again to FIG. 1, it may be seen that the combined unit formed by base section 20 and central section 80 has an extremely small footprint which is nonetheless stable due its pedestal construction. This stability may be further enhanced by the organization of electronic components of the computer processing system so that the center of gravity of central section 80 (with the components housed therein) remains within the footprint of base section 20 throughout the entire angle $\phi$. Stability is further enhanced by the inclusion of an auxillary support structure, such as support wing 40, which extends rearwardly of base section 20. This allows a user to select a wide variety of usable angles $\phi$ to accommodate different light conditions or other environmental circumstances. When used on a support surface such as a desk or table, keyboard section 140 may operate in a standalone mode, such as shown in FIG. 1. This allows the user to vary the distance between display screen 86 and keyboard section 140, as desired. Information is transmitted from keyboard 140 by means of transmitter 190 the transmissions of which are received by receiver 60. In other circumstances, such as when a user seeks to use the computer system on his/her lap or other less stable support, keyboard section 140 may be locked onto base section 20 by means of tabs 160, slots 120 and cooperative mating bayonet latch 70 and 72, as is shown in FIG. 2. In this configuration transmitter 190 and receiver 60 are in closely spaced facing relation to one another, again to allow information to be transmitted from keyboard section 140. When the computer system is desired to be transported, legs 146 may be folded against lower wall 142 of keyboard section 140 and mounting tabs 160 may be inserted into mounting slots 110 in the front recessed portion of central section 80 and fasteners 130 may be employed to secure keyboard section 140 as a cover for display panel 86. Further, base section 40 may be nested in bay 100 and locked into position by clasps 230 so that an extremely compacted carrying unit is provided, as shown in FIG. 3.

Accordingly, the present invention has been described with some degree of particularity directed to the preferred embodiment of the present invention. It should be appreciated, though, that the present invention is defined by the following claims construed in light of the prior art so that modifications or changes may be made to the preferred embodiment of the present invention without departing from the inventive concepts contained herein.

We claim:

1. A case operative to house electronic components for a computer processing system, comprising:
   a base section enclosing a base compartment mountably receiving first electronic components and adapted to be supported on a support surface said base section having a bottom wall, a top wall and a surrounding sidewall including a front wall portion extending between said bottom and top walls;
   a central section enclosing a central compartment mountably receiving second electronic components, said central section having a front face including a display panel portion and a back; and
   hinge means for connecting said central section to said base section along a pivot axis so that said base section and said central section are relatively movable between a closed position wherein said base section is folded against the back of said central section and an open position such that, when said base section is supported on the support surface and said central section is in the open position, said central section is elevated at an angle with respect to said support surface with said display panel thereby being oriented for view by a user, said pivot axis being located proximately to an intersecting portion of said front wall portion and said top wall whereby said base section extends rearwardly of the pivot axis.

2. The case according to claim 1 including a cover section securable to said central section in a fastened position so that said cover section covers said display panel portion, and including means for releasably retaining said cover panel in the fastened position.

3. The case according to claim 2 wherein said cover section is operative to mount third electronic components, and including means for communicating signals from said third electronic components to said second electronic components.

4. The case according to claim 3 wherein said means for communicating signals includes transmitter means in said cover section for generating wireless signals and receiver means in one of said base and central sections for receiving said wireless signals.

5. The case according to claim 4 wherein said wireless signal comprise signals in the electromagnetic spectrum.

6. The case according to claim 4 wherein said wireless signals are in the audio spectrum.

7. A case according to claim 3 including a keyboard section forming a keyboard compartment operative to house a keyboard input wherein said releasable locking means includes a complementary male and female bayonet latch structures, one of said latch structures being mounted in said keyboard section.

8. The case according to claim 2 including releasable locking means for securing said cover section to said base section so that said cover section extends forwardly of said base section.

9. The case according to claim 8 wherein said releasable locking means includes a complementary male and female bayonet latch structures, one of said latch structures being mounted in a keyboard section.

10. The case according to claim 9 wherein said male latch structure is mounted in said keyboard section and said female latch structure is mounted in said base section, and including means for biasing said male latch structure into penetrating engagement with said female latch structure.

11. The case according to claim 10 wherein said male latch structure has radial projections and including means for rotating said male latch structure within said female latch structure whereby said radial projections on said male latch structure become locked into said female latch structure so that said male and female latch structures may selectably be locked and unlocked from one another.

12. The case according to claim 8 including cooperative mounting tabs and alignment slots on said cover and base sections, said tabs and slots operative to orient said cover section with respect to said base section so as to align said releasable locking means and operative in conjunction with said releasable locking means to secure said base and cover sections together in a relatively stiff manner thereby forming a unified base that supports said central section in the elevated position centrally of said unified base.

13. The case according to claim 2 wherein said front has a recess therein so that the front face of said central section is inset and wherein said cover section provides a keyboard section for said computer system, said cover section including an upper wall having a keyboard opening therein through which keys defining a keyboard input upwardly project.

14. The case according to claim 11 wherein said upper wall of said cover section oriented in spaced apart generally parallel relation to said front face when said cover section is in the fastened position with said keys located within the recess.

15. The case according to claim 1 wherein said central section has a lower portion connected to said base section and an enlarged upper portion thereby defining bay, said base section sized to be nestably received in the bay when in the closed position.

16. The case according to claim 15 including latch means for latching said base section in the closed position.

17. The case according to claim 16 wherein said base section includes a support wing extending rearwardly thereof when in the open position, said central section having a rear recess proximate the bay and communicating with the open region whereby said support wing is received therein when said base section is nestably received in the open region.

18. The case according to claim 1 wherein said first and second electronic components are respectively organized within their respective base and central sections whereby the center of gravity resulting therefrom allows said central compartment to be held at a minimum acute angle of forty-five degrees or less with respect to a horizontal support surface.

19. The case according to claim 18 including a support wing support extending rearwardly of said bottom wall and terminating in a common plane therewith, said wing support operative to resist rearward tipping of said base and central components when held at said minimum acute angle.

20. The case according to claim 18 wherein said hinge means for allowing the user to orient said front at a selected support angle between said minimum angle and eighty-five degrees with respect to said support surface.

21. The case according to claim 20 including a brake structure associated with said hinge means, said brake structure operative to maintain said central section so that the front is at the selected support angle.

22. The case according to claim 1 including switch means for disabling operation of the electronic components of said computer system when said base and central sections are in the stored position.

23. The case according to claim 22 wherein said switch means includes a reed switch mounted in one of said base and central sections and a magnet in another of said base and central sections.

24. The case according to claim 23 wherein one of said electronic components is a speaker having said magnet associated therewith.

25. A case for housing a computer processing circuitry, a display panel, a keyboard input and a power supply, comprising:
   a base section enclosing a base compartment operative to house said power supply, said base section having a relatively flat bottom wall, a top wall spaced from said bottom wall and a surrounding base sidewall including a front wall portion;
   a central section enclosing a central compartment operative to house a major portion of said processing circuitry and operating to mount said display panel, said central section having a front containing said display panel and having a step-shaped back formed by a lower portion and an enlarged upper portion so as to provide a bay, said lower portion being pivotally mounted along a pivot axis to said base section whereby said base section and said central section are pivotable with respect to one another from an open position wherein said front is at a selected support angle with respect to said bottom wall and a closed position wherein said base section is nested within the bay; and
   a keyboard section forming a keyboard compartment operative to house said keyboard input, said keyboard section securable to said central section in a fastened position as a cover for said display panel.

26. The case according to claim 25 wherein the upper portion of said central section has a back wall, the bottom wall of said base section and the back wall of said upper portion being substantially co-planar in the closed position.

27. The case according to claim 26 wherein said base section has a supporting wing projecting rearwardly thereof, the back wall of said upper portion having a rear recess formed therein to receive said support wing in the closed position.

28. The case according to claim 25 including releasable locking means for securing said keyboard section to the front wall portion of said base section in a locked state.

29. The case according to claim 28 wherein said keyboard section includes a pair of mounting tabs projecting rearwardly of a rearward portion thereof, said base section having a pair of alignment slots operative to engage said mounting tabs when in the locked state.

30. The case according to claim 29 wherein said central section has a pair of mounting slots operative to engage said mounting tabs when said keyboard section is in the fastened position.

31. The case according to claim 30 wherein said display panel is inset from a front surface of said central section and wherein said keyboard section includes a plurality of positioning posts extending into the recess when in the fastened position whereby said posts help align said keyboard section, and including latching means for retaining said keyboard section in the fastened position.

32. A case operative to house electronic components for a computer processing system, comprising:
   a base section enclosing a base compartment mountably receiving first electronic components and adapted to be supported on a support surface said base section having a bottom wall, a top wall and a surrounding sidewall including a front wall portion extending between said bottom and top walls;
   a support wing connected to said base member, and adapted to be supported on said support surface;
   a central section enclosing a central compartment mountably receiving second electronic components, said central section having a front face including a display panel portion and a back; and
   hinge means for connecting said central section to said base section along a pivot axis so that said base section and said central section are relatively movable between a closed position wherein said base section and said support wing are folded against the back of said central section and an open position such that, when said base section and said support wing are supported on a support surface said central section is in the open position, said central section is movable between a range of selected angles with respect to said support surface wherein said display panel is oriented for viewing by a user, said pivot axis being located proximate to an intersecting portion of said front wall portion and said top wall whereby said base section extended rearwardly of the pivot axis and said support wing extends rearwardly of the base section and is operative to resist tipping of said base and central section regardless of the selected angle of said central section.

* * * * *